US008695537B2

(12) United States Patent
Bizzell et al.

(10) Patent No.: US 8,695,537 B2
(45) Date of Patent: Apr. 15, 2014

(54) SLOW-PULL DOG LEASH

(71) Applicant: Season 4, LLC, Charlotte, NC (US)

(72) Inventors: Daniel Lee Bizzell, Charlotte, NC (US);
Thomas James Philpott, Charlotte, NC (US); Brian Neil Smith, Orlando, FL (US); Michael Starkey, Charlotte, NC (US)

(73) Assignee: Season 4, LLC, Charlotte, NC (US)

( * ) Notice: Subject to any disclaimer, the term of this patent is extended or adjusted under 35 U.S.C. 154(b) by 0 days.

(21) Appl. No.: 13/685,694

(22) Filed: Nov. 26, 2012

(65) Prior Publication Data

US 2013/0284114 A1    Oct. 31, 2013

Related U.S. Application Data

(63) Continuation of application No. 13/609,244, filed on Sep. 10, 2012, now abandoned, which is a continuation-in-part of application No. 13/459,180, filed on Apr. 28, 2012, now abandoned.

(51) Int. Cl.
*A01K 27/00* (2006.01)
*B65H 75/44* (2006.01)

(52) U.S. Cl.
CPC .......... *A01K 27/004* (2013.01); *B65H 75/4434* (2013.01); *B65H 75/4442* (2013.01)
USPC ......... 119/796; 119/794; 242/381; 242/396.6

(58) Field of Classification Search
CPC .......................... A01K 27/004; B65H 75/4434
USPC .................. 119/794, 796; 254/322, 378, 379; 242/384.7, 385, 388.2, 381, 381.4, 242/396.6

IPC ...................................................... A01K 27/00
See application file for complete search history.

(56) References Cited

U.S. PATENT DOCUMENTS

| 3,061,234 | A | * | 10/1962 | Morey | 242/378.2 |
|---|---|---|---|---|---|
| 5,053,586 | A | * | 10/1991 | Hansson | 191/12.2 R |
| 5,697,599 | A | * | 12/1997 | Lamb | 254/328 |
| 7,036,459 | B1 | * | 5/2006 | Mugford et al. | 119/796 |
| 8,393,302 | B1 | * | 3/2013 | Blakemore | 119/796 |
| 2008/0230015 | A1 | * | 9/2008 | Bleshoy | 119/796 |
| 2011/0036304 | A1 | * | 2/2011 | Smith | 119/796 |
| 2011/0220036 | A1 | * | 9/2011 | Matthews | 119/796 |
| 2013/0008392 | A1 | * | 1/2013 | Holmstrom | 119/796 |
| 2013/0200197 | A1 | * | 8/2013 | Bogdahn et al. | 242/396 |

* cited by examiner

*Primary Examiner* — Shadi Baniani
(74) *Attorney, Agent, or Firm* — Tillman Wright, PLLC; Chad D. Tillman

(57) ABSTRACT

A leash apparatus includes a housing containing a spool assembly, a spring biased lever arm, and a first tensioning line. The first tensioning line is attached to a first end of the lever arm and wrapped at least once around the spool assembly, and has an opposite end attached to other than the rotatable portion of the spool assembly, such as a fixed location on the leash housing on a mounting of the spool assembly. A surface of the spool assembly slidingly rotates relative to the tensioning line portion that wraps at least once around the spool assembly. A second tensioning line is wound about the spool assembly and extends outside of the housing. The second tensioning line is guided around a wheel attached to a second end of the lever arm located on an opposite side of the lever arm.

20 Claims, 10 Drawing Sheets

Front View

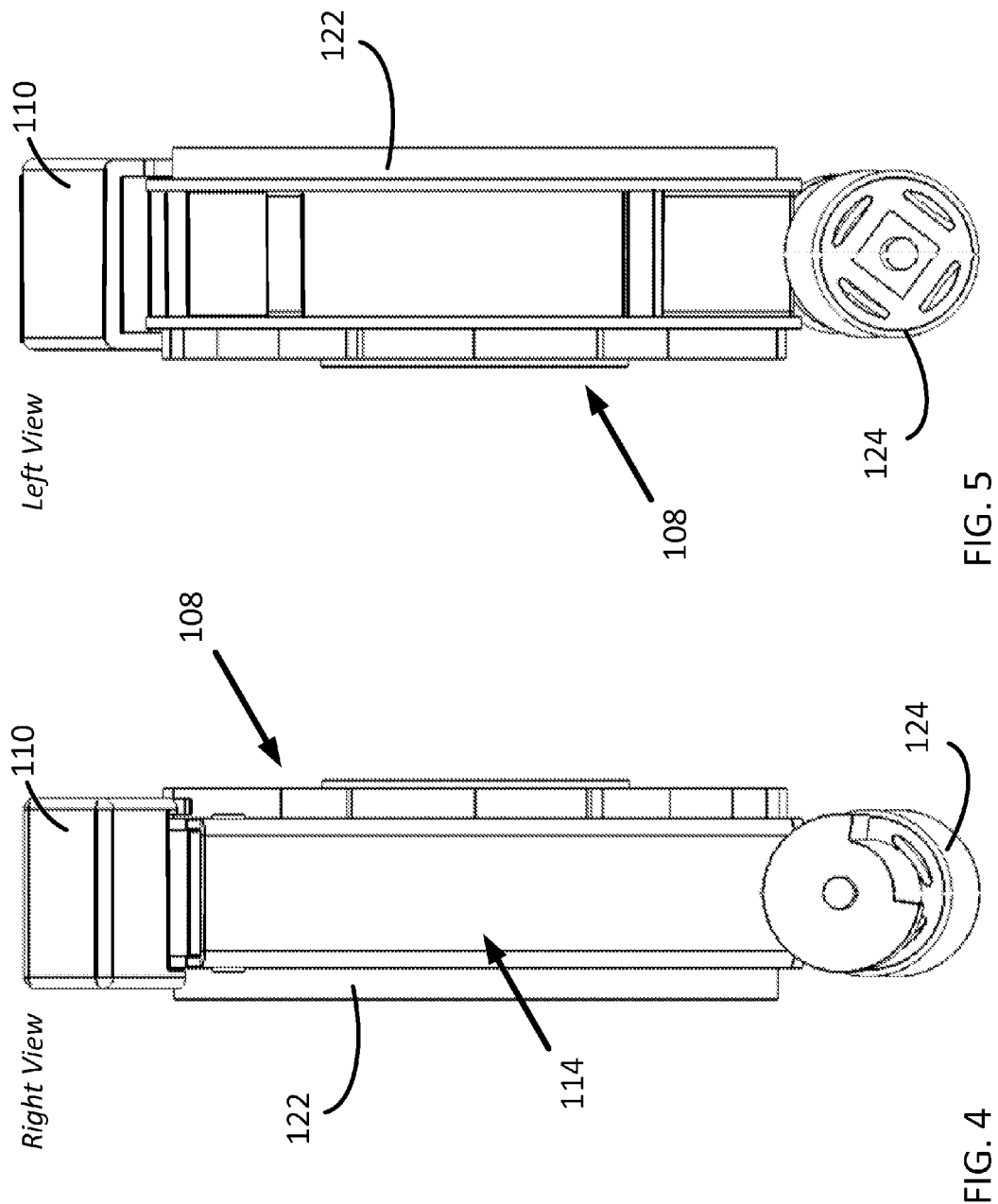

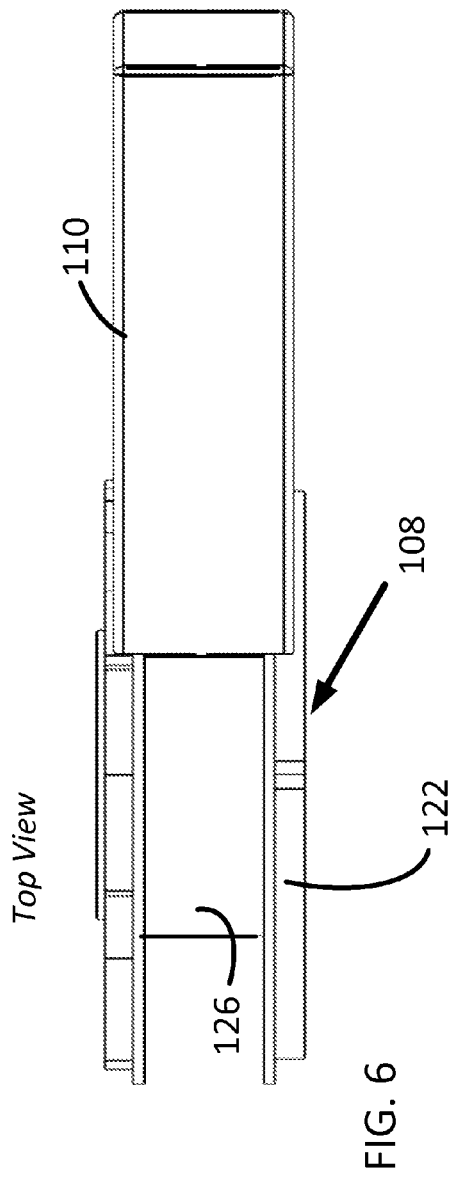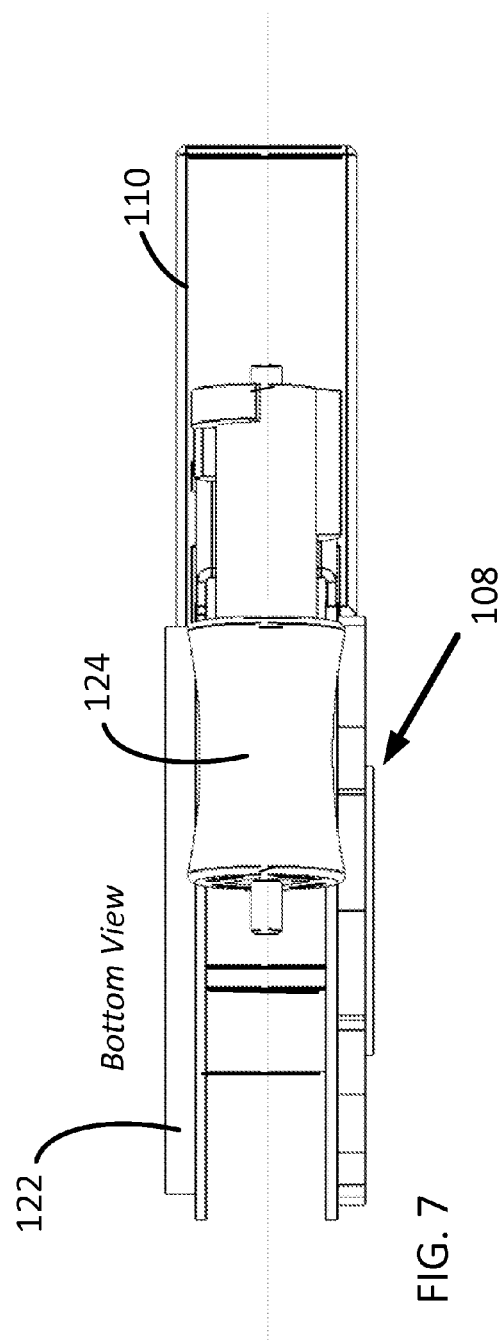

SLOW-PULL DOG LEASH

CROSS-REFERENCE TO RELATED APPLICATION

The present application is a U.S. continuation patent application of, and claims priority under 35 U.S.C. §120 to, U.S. nonprovisional patent application Ser. No. 13/609,244, filed Sep. 10, 2012, which '244 application, and any application publication thereof and patent issuing therefrom, are incorporated herein by reference, and which '244 application is a U.S. continuation-in-part patent application of, and claims priority under 35 U.S.C. §120 to, U.S. nonprovisional patent application Ser. No. 13/459,180, filed Apr. 28, 2012, which '180 application, and any application publication thereof and patent issuing therefrom, are incorporated herein by reference. Moreover, the disclosures of the '180 patent application is contained in the Appendix to the Specification, which forms a part hereof and is incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to leashes for walking pets and, in particular, to leashes for walking dogs.

Leashes for walking pets are well known. Representative dog leashes are disclosed, for example, in the following U.S. Pat. Nos. 3,937,418; 4,269,150; 4,887,551; 6,688,260; and 7,886,700.

A problem often encountered when walking a pet using a retractable leash is compensating for, or otherwise limiting, quick acceleration by the pet which can occur, for example, when the pet sees another animal and lunges after it. Retractable leases generally include a user-actuated break mechanism that locks the retractable leash against further extension of a cord by which the pet is tethered to the leash; however, actuating the breaking mechanism during quick acceleration can lead to a jerking stop of the pet that may injure the pet. On the other hand, a person walking a pet who does not actuate the breaking mechanism and/or who is caught off guard can be injured himself or herself when the fast-extending cord reaches its fully extendable length resulting in a jerking of the person's arm and, likely, the unintended release of the lead itself.

One or more embodiments of the present invention provide the benefit of opposing the accelerated unwinding of a cord from a retractable leash when walking a pet which is not dependent upon a person actuating a breaking mechanism of the leash.

SUMMARY OF THE INVENTION

The present invention includes many aspects and features. Moreover, while many aspects and features relate to, and are described in, the context of dog leashes, the present invention is not limited to use only with dogs, and the invention has applicability with respect to other animals too, as will become apparent from the following summaries and detailed descriptions of aspects, features, and one or more embodiments of the present invention.

Accordingly, one aspect of the present invention relates to a leash apparatus that includes a housing containing a spool assembly, a spring biased lever arm, and a first tensioning line. The first tensioning line is attached to a first end of the lever arm and wrapped at least once around the spool assembly, and has an opposite end attached to other than the rotatable portion of the spool assembly, such as a fixed location on the leash housing on a mounting of the spool assembly. A surface of the spool assembly slidingly rotates or slips relative to the tensioning line portion that wraps at least once around the spool assembly.

In accordance with this aspect, a second tensioning line is wound about the spool assembly and extends outside of the housing for attachment to a collar of harness of an animal, the second tensioning line being guided around a wheel attached to a second end of the lever arm located on an opposite side of the lever arm to the first end relative to a pivot axis of the lever arm. Upon a certain magnitude of acceleration in the unwinding of the second tensioning line from the spool, the lever arm is moved against the biasing spring so as to pull on the first tensioning line, tightening it about the spool assembly and creating friction with the rotating movement of the spool assembly, thereby acting against the acceleration of the unwinding of the second tensioning line.

Moreover, the greater the acceleration of the line, the greater the lever arm is moved against the biasing spring, the greater the first tensioning line is tightened about the spool assembly creating friction therewith, and the grater the opposition to the acceleration of the unwinding of the second tensioning line.

In another aspect, a method of walking a pet comprises the use of the aforementioned leash apparatus.

In a feature, the first tensioning line is wrapped about a surface of the spool assembly that is axially offset from area about which the second tensioning line is wound.

In another feature the surface about which the first tensioning line is wound comprises a steel surface.

In another feature the first tensioning line is wrapped about a surface of the spool assembly that is a radial distance greater than the radial distance of the area about which the second tensioning line is wound.

In another aspect, a leash for restraining a pet from extending a cord of the leach too quickly while walking the pet includes: a housing including an opening in the housing from which a cord is extendable and into which the cord is retractable, the housing containing a spool assembly onto which the cord is wound for winding of the cord during retraction of the cord into the housing, and for unwinding of the cord during extension of the cord from the housing; a spring biased lever arm that is rotatable about a pivot axis; a pulley located proximate one end of the spring biased lever arm, around which the cord is guided in traveling from the spool assembly to the opening in the housing; and a tensioning line attached proximate an end of the lever arm opposite to the pulley, the tensioning line being wrapped at least once around the spool assembly in engagement with a surface of the spool assembly, and attached to a portion of the leash that does not rotate with the spool assembly, such that the surface of the spool assembly slidingly slips in frictional engagement with the tensioning line wrapped at least once around the spool assembly; wherein pulling the cord from the housing causes pivoting movement of the spring biased lever arm about the pivot axis, which causes pulling of the tensioning line resulting in a tightening of the tensioning line about the wrapped surface of the spool assembly, and thereby creating greater frictional engagement with the rotating spool assembly.

In a feature, the tensioning line comprises a cable.

In another feature, the tensioning line is attached at a fixed location to the leash housing.

In a feature, the tensioning line is attached at a fixed location on a mounting of the spool assembly on which the spool assembly rotates.

In a feature, the tensioning line is wrapped about a surface of the spool assembly that is axially offset from area about which the cord is wound.

In a feature, the tensioning line is wrapped about a surface of the spool assembly that is a radial distance greater than the radial distance of the area about which the cord is wound, and the first tensioning line is wrapped about a surface of the spool assembly that is axially offset from area about which the second tensioning line is wound.

In a feature, the surface of the spool assembly about which the tensioning line is wrapped comprises a stainless wrapped surface.

In a feature, the housing defines a handle grip.

In a feature, the cord is retracted into the housing and wound onto the spool assembly by a spring biased mechanism.

In a feature, the leash further includes a slide lock which can be manually actuated to engage the spool assembly and lock the spool assembly against unwinding of the cord relative to the housing, wherein when the slide lock is engaged and the cord is pulled, the lever arm is subject to further movement about pivot axis further resulting the tightening of the tensioning line about the spool assembly and thereby supplementing slide lock in restricting further unwinding of the spool assembly.

In another feature, the leash further includes a resistance adjustment wheel configured to alter the extent to which the lever arm moves about pivot axis when pulled by the cord during extension of the cord from the housing by acting as a backstop to the range of movement of the lever arm and, thus, limiting the degree of tightening of the tensioning line the spool assembly and resulting friction created therebetween.

In a feature, the resistance adjustment wheel includes multiple settings, including a setting at which the range of motion of the lever arm is not limited by the adjustment wheel.

In a feature, the housing if formed from a molding process and further comprises sections of a co-molded elastomer.

In another feature, a method of restraining a pet from extending a cord of a retractable leach too quickly while walking the pet includes the step of providing a leash comprising a housing. The housing includes an opening from which a cord is extendable and into which the cord is retractable, and the housing contains a spool assembly onto which the cord is wound for winding of the cord during retraction of the cord into the housing, and for unwinding of the cord during extension of the cord from the housing; a manually actuated slide lock for blocking the spool assembly from unwinding of the cord, a spring biased lever arm that is rotatable about a pivot axis; a pulley located proximate one end of the spring biased lever arm, around which the cord is guided in traveling from the spool assembly to the opening in the housing; and a tensioning line attached proximate an end of the lever arm opposite to the pulley, the tensioning line being wrapped at least once around the spool assembly in engagement with a surface of the spool assembly, and attached to a portion of the leash that does not rotate with the spool assembly, such that the surface of the spool assembly slidingly slips in frictional engagement with the tensioning line wrapped at least once around the spool assembly. Wherein pulling the cord from the housing causes pivoting movement of the spring biased lever arm about the pivot axis, which causes pulling of the tensioning line resulting in a tightening of the tensioning line about the wrapped surface of the spool assembly, and thereby creating greater frictional engagement with the rotating spool assembly. The method further includes the steps of attaching an end of the cord extending from the housing to a collar or harness of the pet; and walking with the pet while holding a handle of the leash, wherein the method of restraining the pet does not require manual actuation of the slide lock of the leash.

Additional aspects and features are disclosed below and in the drawings.

Furthermore, in addition to these aspects and features, it will be understood that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings.

FIG. 4 is a schematic illustration of the interior components of the dog leash of FIG. 1 viewed from the right side relative to the view FIG. 1, in which illustration the cable, cord, and housing are omitted.

FIG. 5 is a schematic illustration of the interior components of the dog leash of FIG. 1 similar to that of FIG. 4, but viewed from the opposite side of that of FIG. 1.

FIG. 6 is a schematic illustration of the interior components of the dog leash of FIG. 1 similar to that of FIG. 4, but viewed from a top side.

FIG. 7 is a schematic illustration of the interior components of the dog leash of FIG. 1 similar to that of FIG. 4, but viewed from a bottom side.

DETAILED DESCRIPTION

Figure 1:
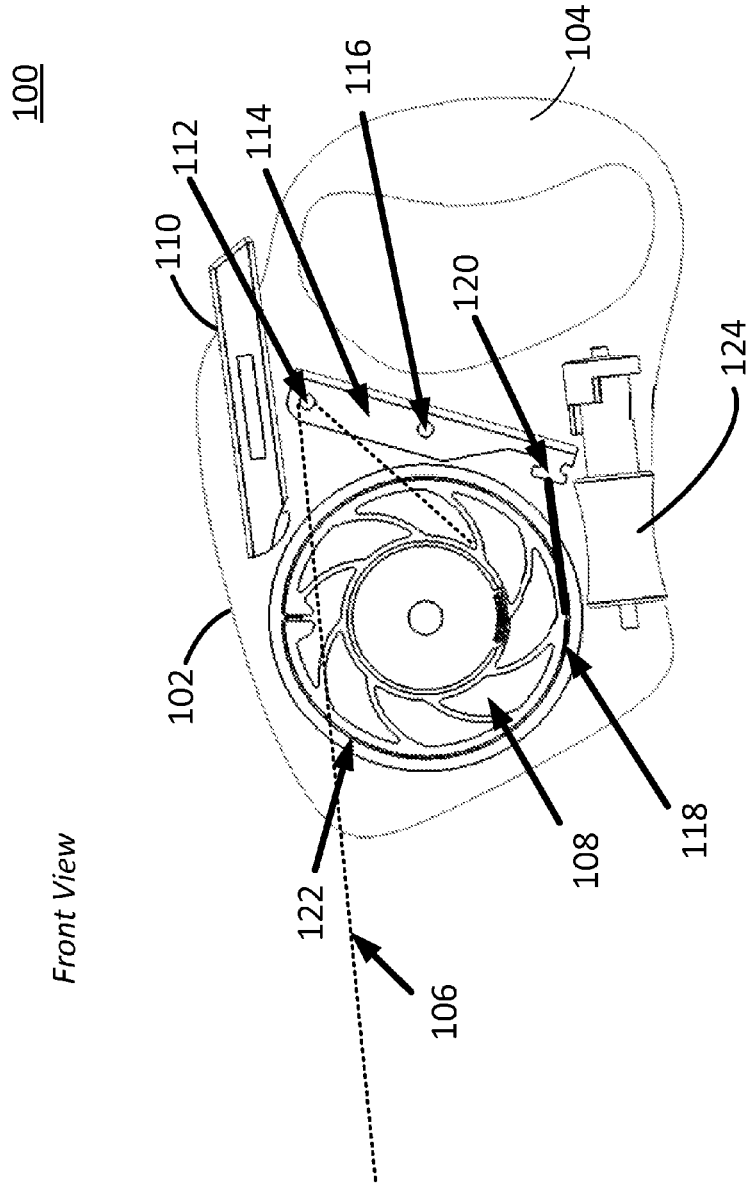
FIG. 1 is a schematic illustration of a preferred embodiment of a dog leash in accordance with one or more aspects and features of the present invention.
Figure 2:
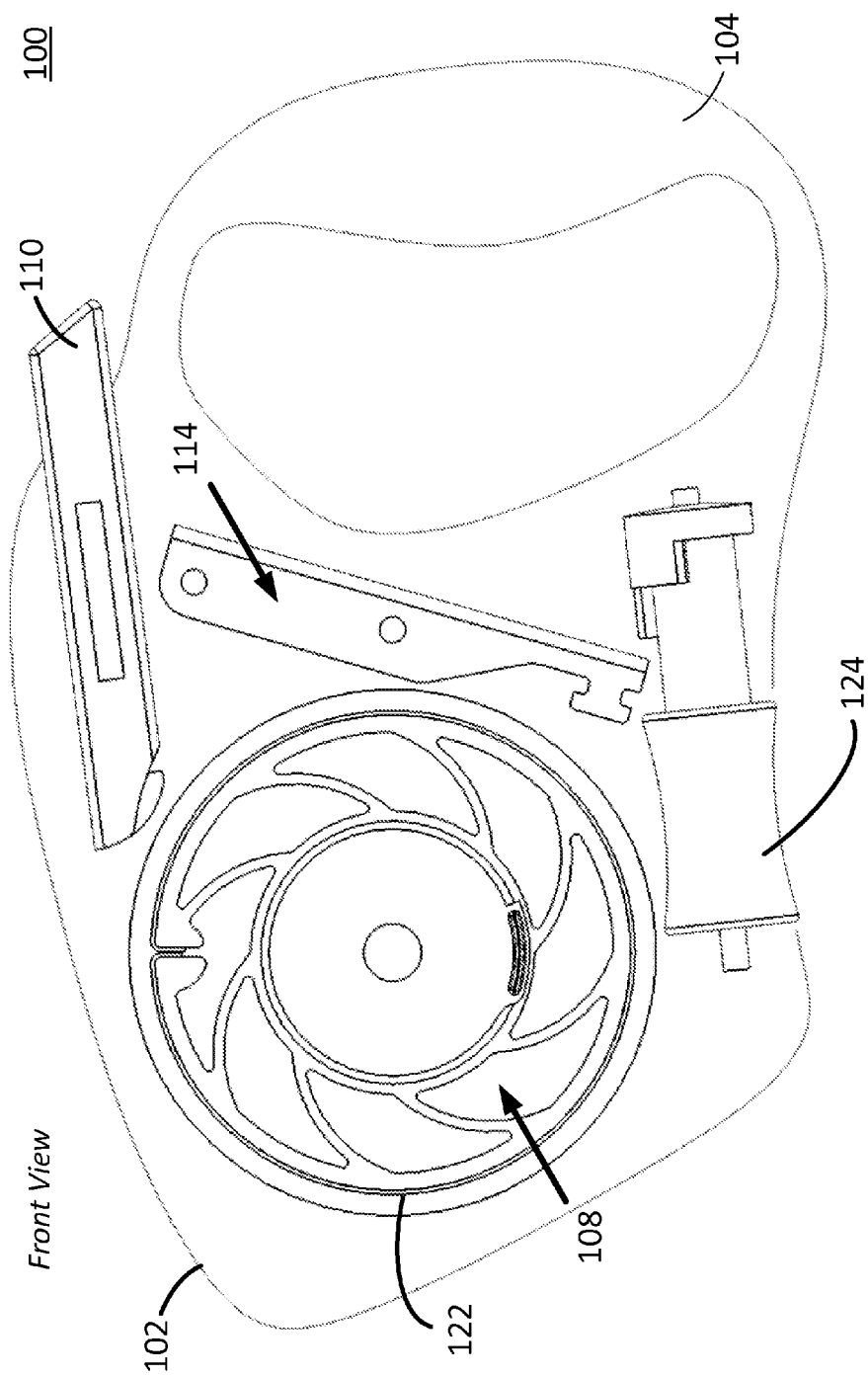
FIG. 2 is another schematic illustration of the dog leash of FIG. 1 similar to the view of FIG. 1, wherein the cable and cord are omitted.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

A preferred dog leash 100 is now disclosed and described in detail with reference to FIGS. 1-9. The leash 100 is schematically shown as including a housing 102 that defines a handle grip 104. As will be appreciated, the leash 100 is a retractable dog leash and includes a cord 106 that extends from the housing 102 for attachment to a collar or harness of a pet. The remainder of the cord 106 is contained within the housing 102 in a wound condition on spool assembly 108. The cord 106 is retracted into the housing 102 and wound onto the spool assembly 108 by a conventional spring biased mechanism, which can be any conventional spring biased mechanism typically used in dog leashes. The housing 102 also includes a slide lock 110, which can be manually actuated to engage the spool assembly 108 and lock the spool assembly 108 against further unwinding of the cord 106 relative to the housing 102. As perhaps best illustrated in FIG. 3, the slide lock 110 includes one end 112 that obstructs and otherwise abuts the spool assembly 108 and thereby keeps it from unwinding when the slide lock 110 is manually depressed. As is conventional, the slide lock 110 preferably is spring biased into an extended position where it does not restrict extension of the cord 106.

In accordance with the preferred leash 100, the cord 106 is guided around a cord free wheel 112 in extending from an opening in the housing 102 to the spool assembly 108. The cord free wheel 110 guides the cord 106 therearound. The cord free wheel 110 is located proximate one end of a spring biased lever arm 114 that is rotatable about a pivot axis 116. The lever arm 114 is biased toward a position in which the cord free wheel 112 is located toward the back of the leash 100 where the handle grip 104 is located. The cord free wheel 112 preferably freely rotates and serves as a pulley with respect to the cord 106 guided therearound.

Furthermore, a tensioning line in the form of a cable 118 is provided that is attached at a cable attachment point 120 proximate the opposite end of the lever arm 114 relative to the cord free wheel 112. The cable 118 preferably comprises a stainless steel wire rope and the cable 118 is wrapped at least once around the spool assembly 108, and has an opposite end that is attached to other than the rotatable portion of the spool assembly 108. For instance, the opposite end of the cable 118 is attached at a fixed location on the leash housing 102 or, alternatively, on a mounting of the spool assembly 108 on which the spool assembly 108 rotates. In either scenario, a surface 122 of the spool assembly 108 slidingly rotates or slips relative to the portion of the cable 118 that wraps at least once around the spool assembly 108. Preferably, the surface 122 of the spool assembly 108 is a stainless wrapped surface and can endure the friction generated in use of the leash 100 over an extended period of time. As will be seen from review of FIGS. 1 and 6, for example, the surface 122 of the spool assembly 108 about which the cable 118 is wrapped is at a radial distance that is greater than the radial distance of the area 126 of the spool assembly 108 about which the cord 106 is wound. FIG. 6 further shows the axial offset of the surface 122 from the area 126.

In use, a certain magnitude of acceleration in the unwinding of the cord 106 line from the spool assembly 108 causes the spring biased lever arm to move toward the opening in the housing 102 and the spool assembly 108, which shortens the path of the cord 106 within the housing 102. This pivoting movement of the spring biased lever arm 114 about pivot axis 116 pulls on the cable 118. Because the cable 118 has one end fixed at the cable attachment point 120 on the lever arm 114, and the other end fixed relative to the housing 102, the pulling on the cable 118 results in a tightening of the cable 118 about the wrapped surface of the spool assembly 108 creating greater frictional engagement with the rotating spool assembly 108. This greater frictional engagement opposes and acts against the acceleration of the unwinding of the cord 106 from the spool assembly 108.

Moreover, it is believed that the greater the acceleration of the cord 106 from the housing 102, the further the lever arm 114 is moved, the greater the cable 118 is tightened about the spool assembly 108 creating friction therewith, and the greater the opposition to the acceleration of the unwinding of the cord 106 from the housing 102.

In other words, when the dog accelerates fast enough, the cord free wheel is pulled toward the front of the leash housing and way from the handgrip, which causes the other end of the lever to move toward the rear and the handgrip, thereby resulting in pulling of the steel rope wrapped around the steel wrapped surface of the spool. The friction created by the steel rope tightening around the spool serves to restrict rotation of the spool and, thus, acts to oppose the unwinding of the cord from the spool as a result of the pull of the dog. As will be appreciated, this acts as resistance to the pulling of the dog and effectively slows the dog. Moreover, this resistance is created only upon the sufficient acceleration of the dog.

It will further be appreciated that, as a consequence of the aforedescribed structure and operation, when the slide lock 110 is engaged and a pet continues to pull on the cord 106, the lever arm 114 will be subject to further movement about pivot axis 116 further resulting the tightening of the cable 118 about the spool assembly 108 and, thereby, supplementing slide lock 110 in restricting further unwinding of the spool assembly 108. Furthermore, in certain situations the failure of the slide lock 110, or the manual release thereof whether intentional or unintentional, still would not result in unwinding of the spool assembly 108 if the cable 118 is sufficiently pulled tight about the spool assembly 108 upon such failure or release of the slide lock 110.

Figure 3:
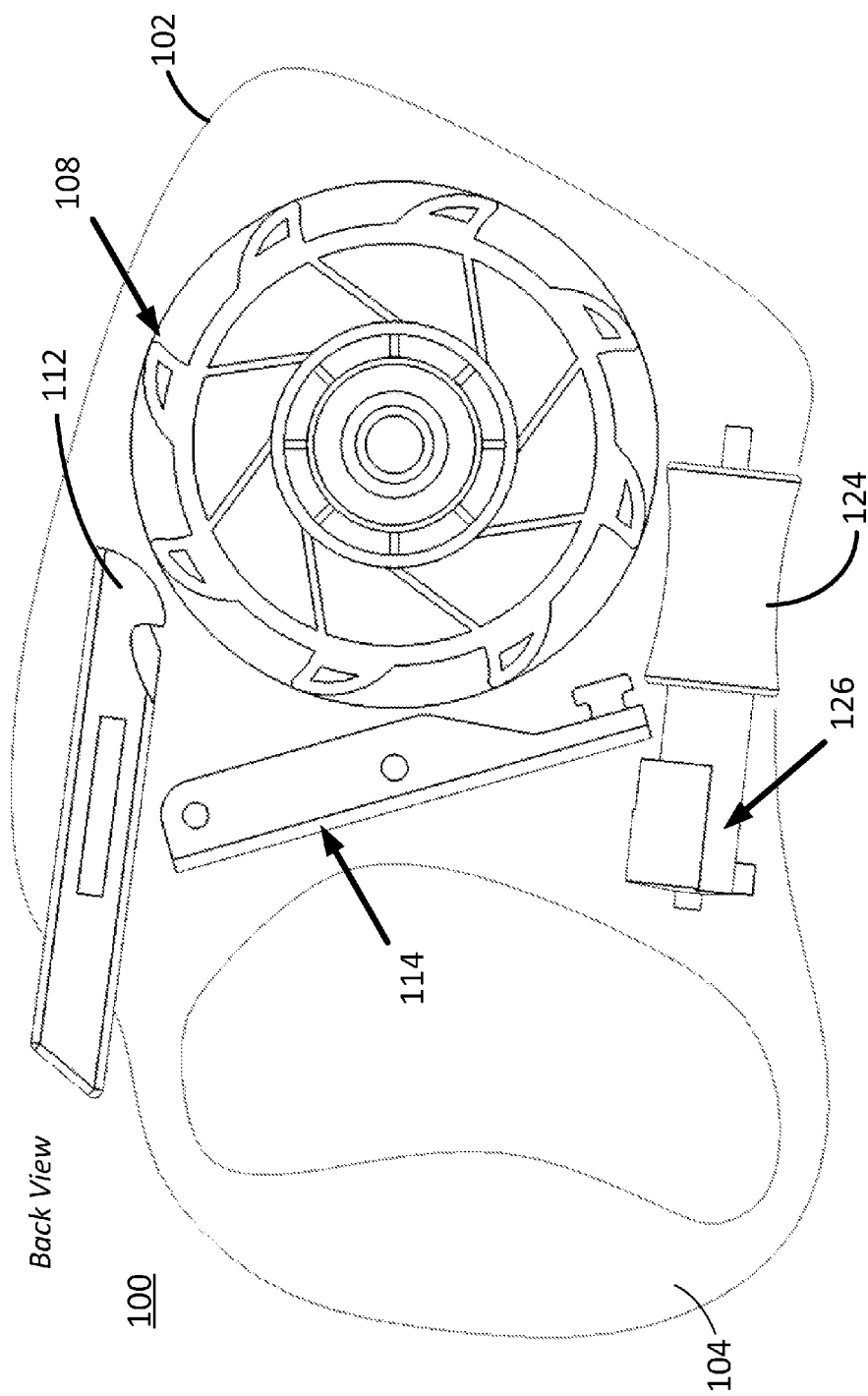
FIG. 3 is a schematic illustration of the dog leash of FIG. 1 viewed from the opposite side of that of FIG. 2.

The leash 100 further preferably includes a resistance adjustment wheel 124 that is located on the underneath of the leash housing 102 and that serves to alter the extent to which the lever arm 114 can move about pivot axis 116. By acting as a backstop to the range of movement of the lever arm 114, the extent of deflection caused by pulling of the cord 106 from the housing 102 and, thus, the degree of tightening of the steel cable about the spool assembly and resulting friction, can be limited. This adjustment can be used to avoid binding, if desired. Moreover, as revealed in FIGS. 1-3, there are four settings in the preferred leash 100 that is illustrated, with the least extent the lever arm 114 can deflect being selected in the position shown in FIG. 1. In the fourth setting, the lever arm 114 does not engage the adjustment wheel 124 and no backstop is provided; this fourth position is represented in FIG. 3, where the adjustment wheel 124 is shown having one area 126 with no radial extension for engagement of the lever arm 114 during rotational movement of the lever arm 114.

Figure 8:
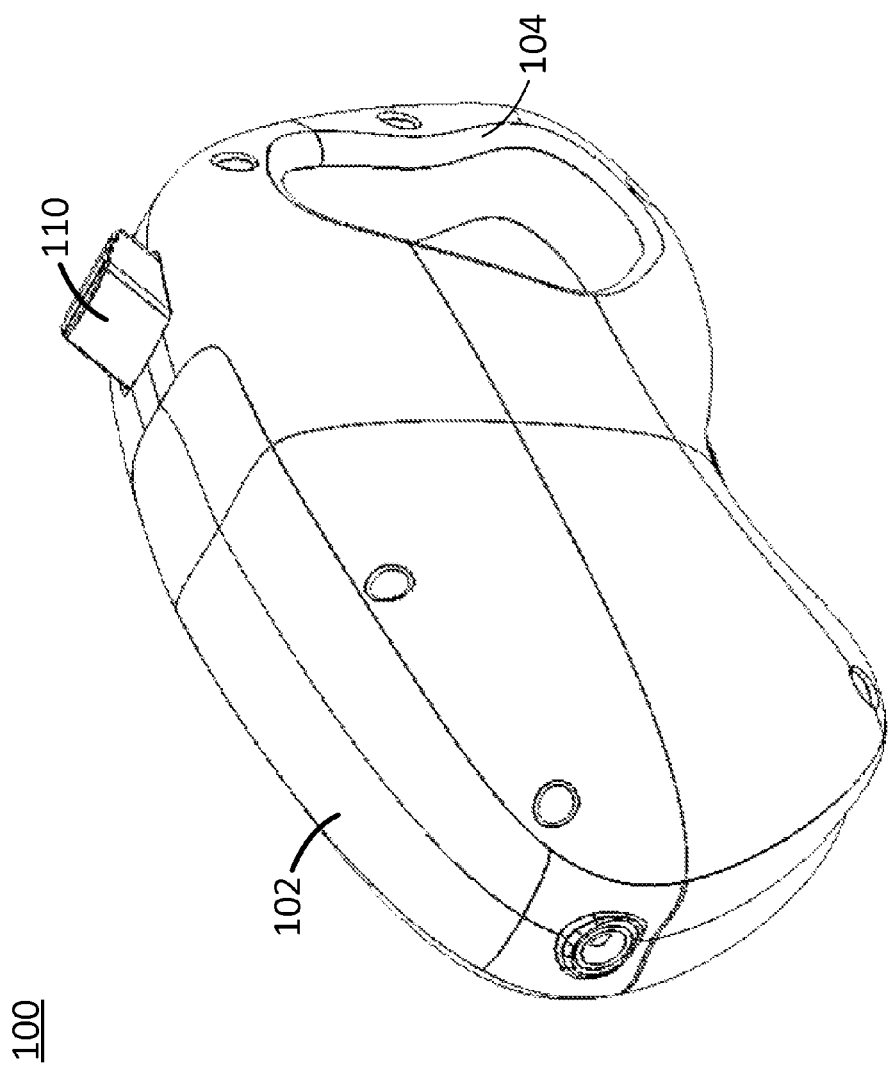
FIG. 8 is a perspective view of the leash which is schematically illustrated in FIG. 1, wherein the cord is omitted.
Figure 9:
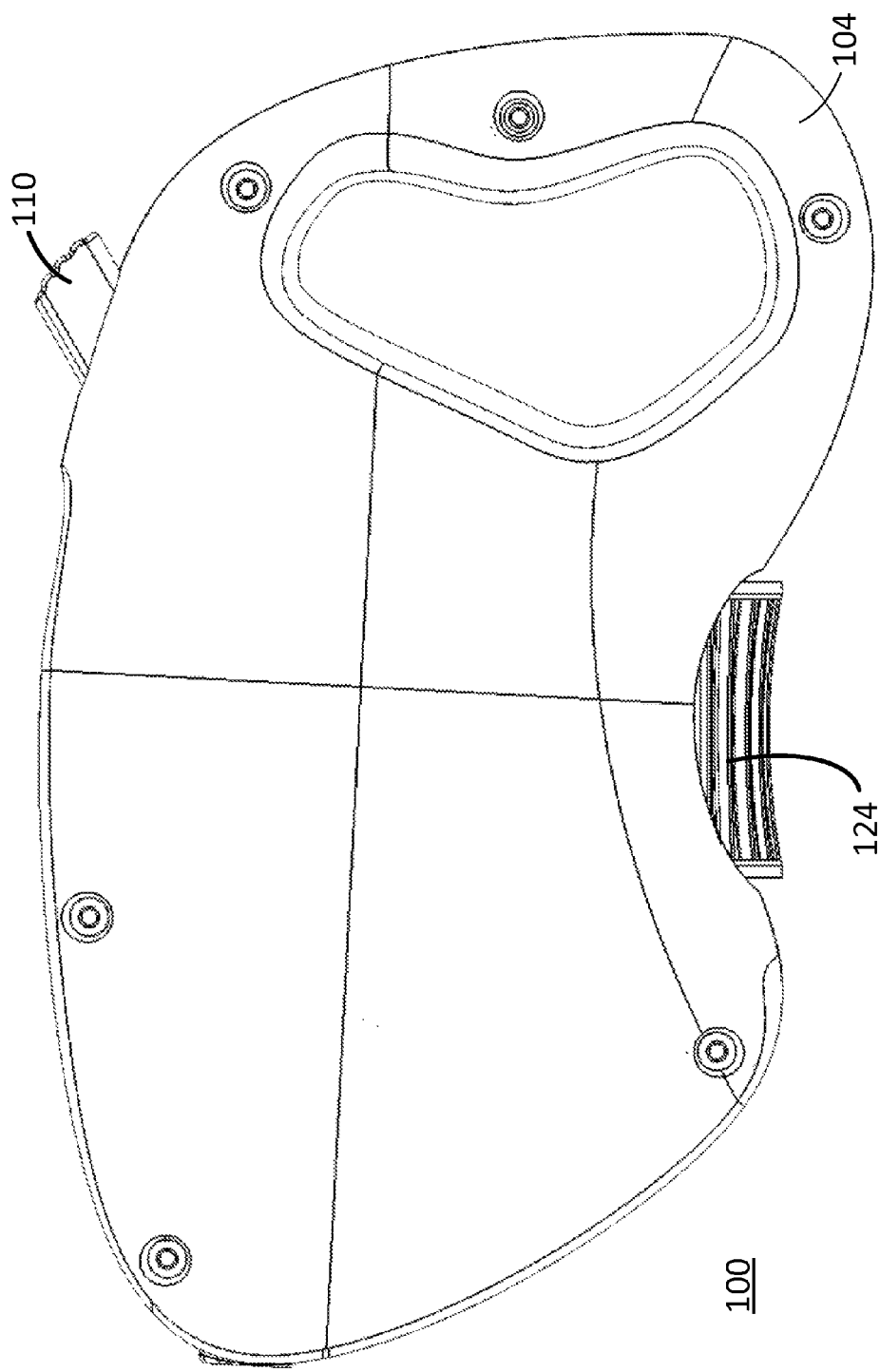
FIG. 9 is another view of the leash of FIG. 8.

Additional illustrations of the spool assembly 108; slide lock 110; lever arm 114; and adjustment wheel 124 are found in FIGS. 3-7. Moreover, FIG. 8 is a perspective view of the leash 100 which has been schematically illustrated in FIG. 1 and discussed above. It will be appreciated that the cord 106 has been omitted in FIG. 8. FIG. 9 is an elevational view of the leash 100 of FIG. 8.

Figure 10:
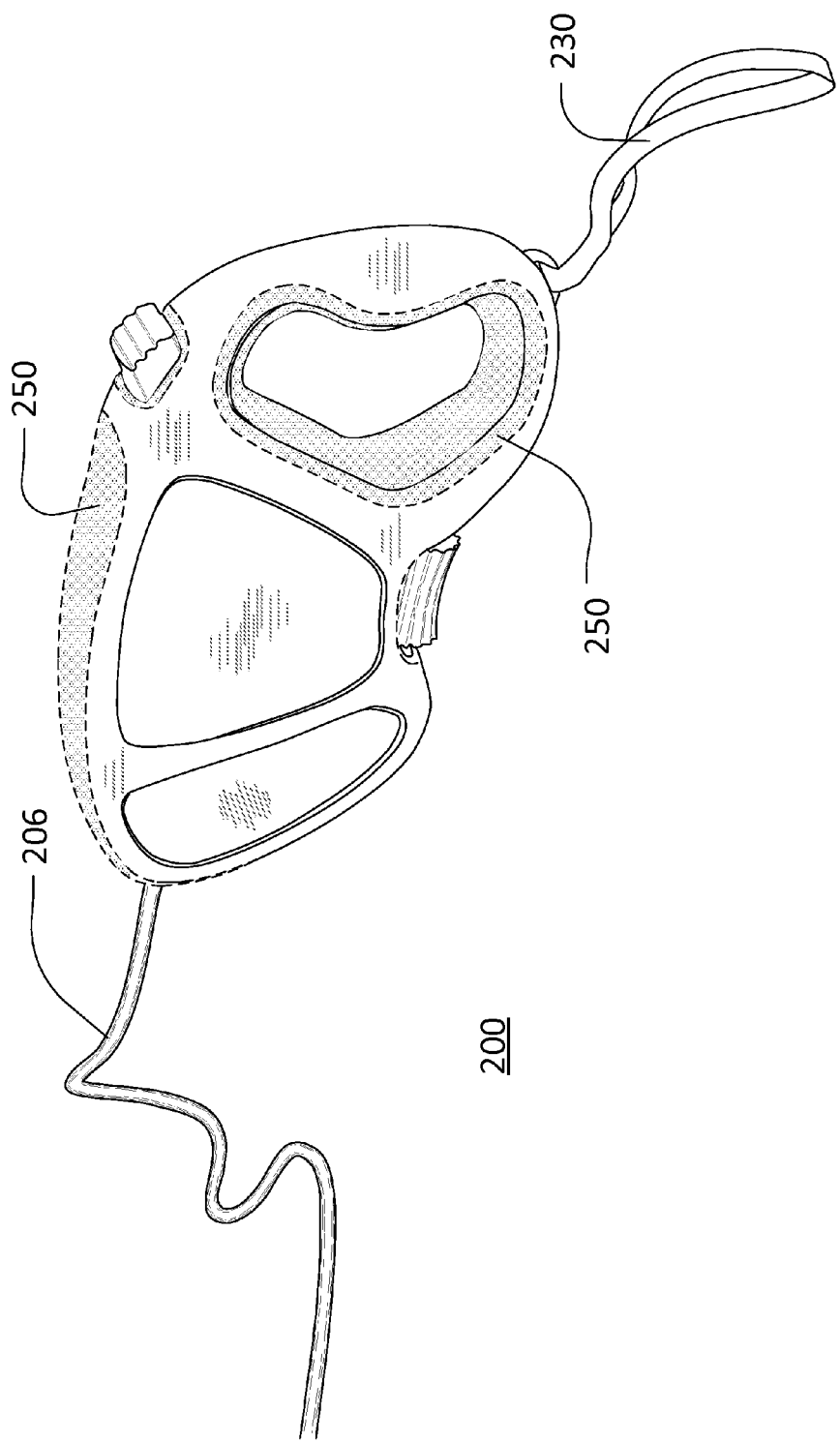
FIG. 10 is a perspective view of another preferred embodiment of a leash in accordance with the present invention.
Figure 11:
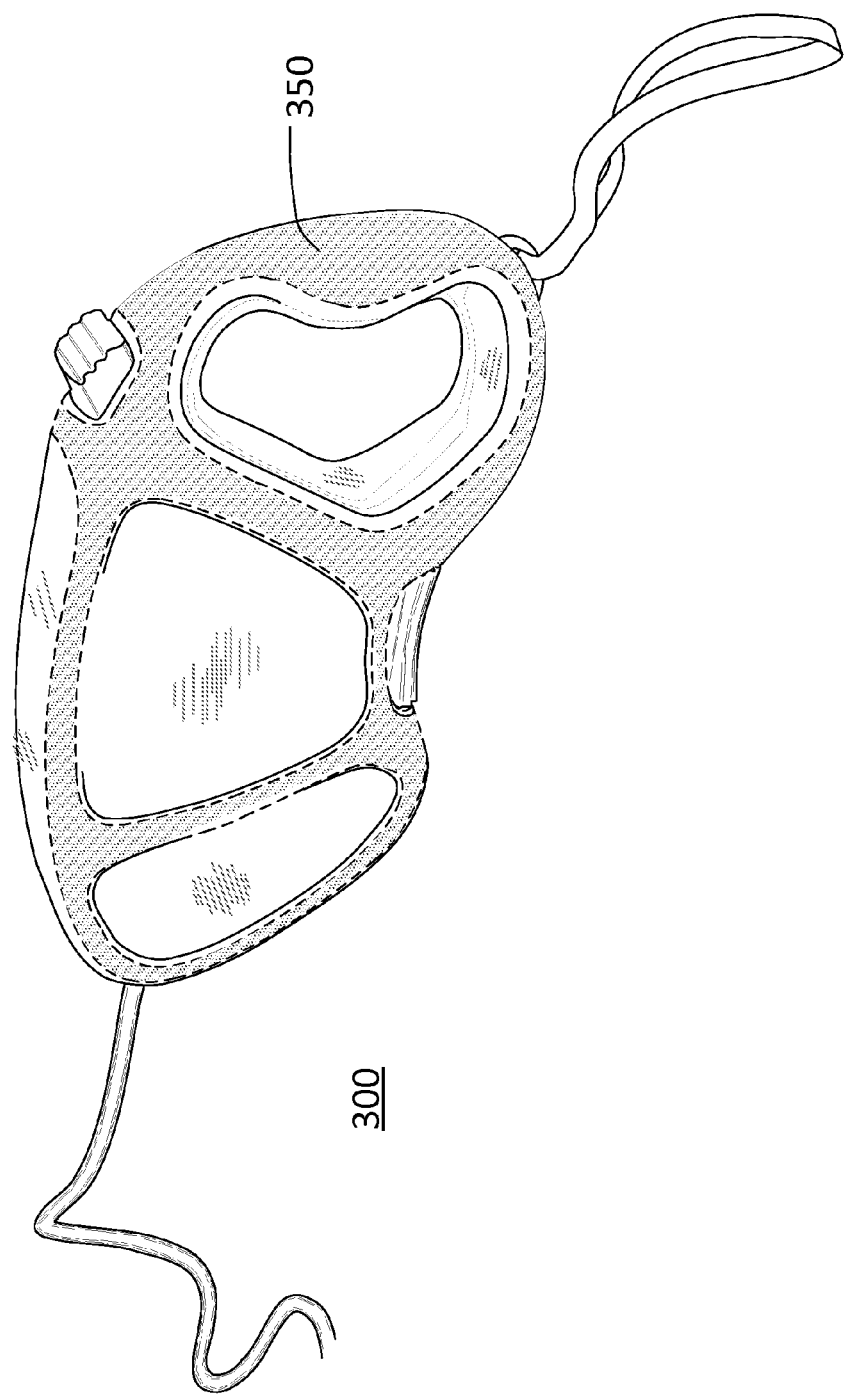
FIG. 11 is a perspective view of another preferred embodiment of a leash in accordance with the present invention.
Figure 12:
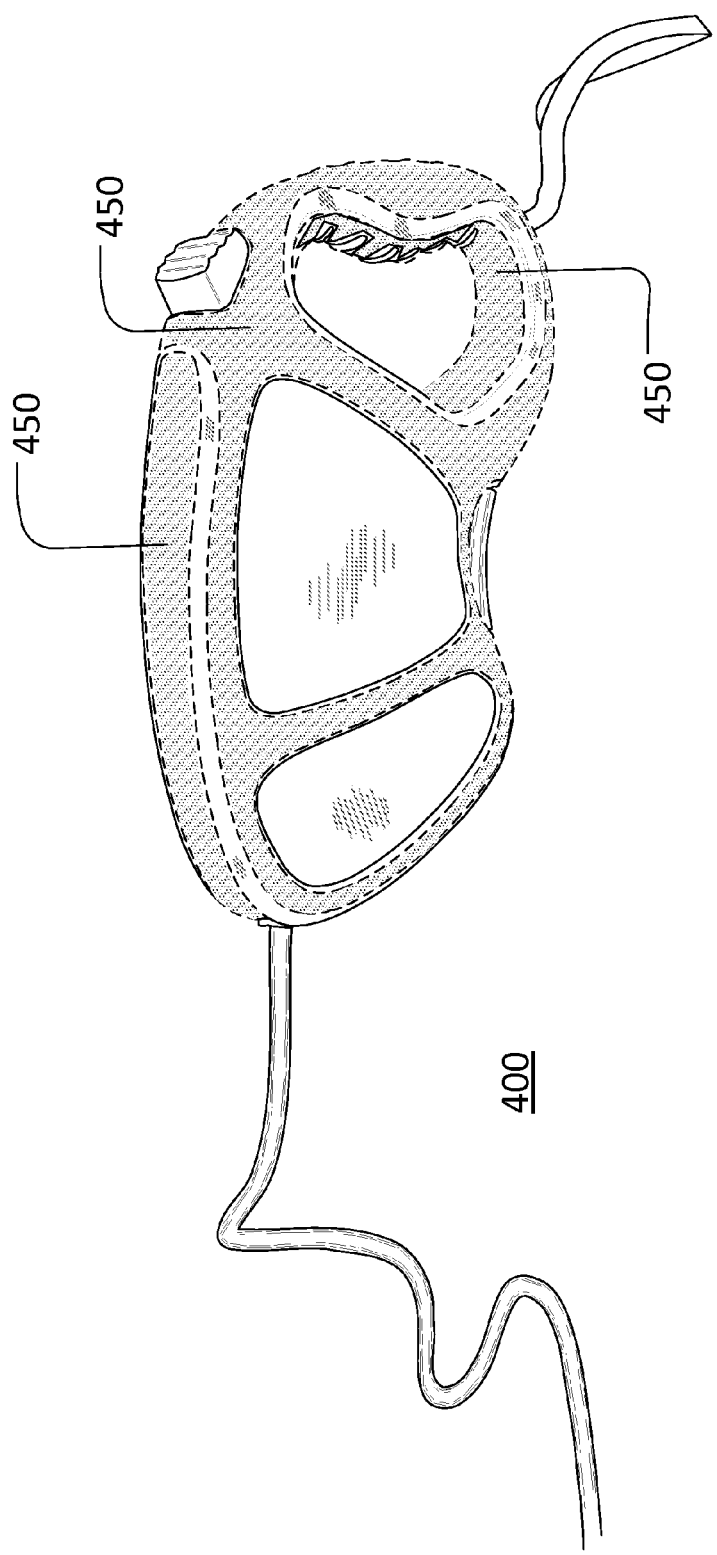
FIG. 12 is a perspective view of yet another preferred embodiment of a leash in accordance with the present invention.

Additional preferred embodiments of leashes are shown in FIG. 10 (leash 200); FIG. 11 (leash 300), and FIG. 12 (leash 400). Preferably, each of these leashes includes the same internal structural components and same operation as those of leash 100 described above with reference to FIGS. 1-9.

Additionally, with regard to leash 200, a cord 206 and wrist strap 230 are illustrated. The housing 202 also includes sections 250 having a co-molded elastomer. These sections are bounded by dashed lines in FIG. 10.

With regard to leash 300, the housing includes sections 350 having a co-molded elastomer, which are bounded by dashed lines in FIG. 11; and with regard to leash 400, the housing includes sections 450 having a co-molded elastomer, which are bounded by dashed lines in FIG. 11.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A leash apparatus, comprising:
  (a) a housing containing,
    (i) a spool assembly,
    (ii) a lever arm, and
    (iii) a first tensioning line attached to a first end of the lever arm and wrapped at least once around the spool assembly, and having an opposite end attached to other than the rotatable portion of the spool assembly, wherein a surface of the spool assembly slidingly rotates relative to the tensioning line portion that wraps at least once around the spool assembly; and
  (b) a second tensioning line wound about the spool assembly and extending outside of the housing for attachment to a collar of harness of an animal, the second tensioning line being guided around a wheel attached to a second end of the lever arm located on an opposite side of the lever arm to the first end relative to a pivot axis of the lever arm;
  (c) wherein, upon a certain magnitude of acceleration in the unwinding of the second tensioning line from the spool, the lever arm pivots so as to pull on the first tensioning line, tightening the first tensioning line about the spool assembly and creating friction with the rotating movement of the spool assembly, thereby acting against the acceleration of the unwinding of the second tensioning line.

2. The leash apparatus of claim 1, wherein the first tensioning line is wrapped about a surface of the spool assembly that is axially offset from area about which the second tensioning line is wound.

3. The leash apparatus of claim 1, wherein the surface about which the first tensioning line is wound comprises a steel surface.

4. The leash apparatus of claim 1, wherein the first tensioning line is wrapped about a surface of the spool assembly that is a radial distance greater than the radial distance of the area about which the second tensioning line is wound.

5. The leash apparatus of claim 4, wherein the first tensioning line is wrapped about a surface of the spool assembly that is axially offset from area about which the second tensioning line is wound.

6. A leash for restraining a pet from extending a cord of the leash too quickly while walking the pet, comprising: a housing including an opening in the housing from which a cord is extendable and into which the cord is retractable, the housing containing a spool assembly onto which the cord is wound for winding of the cord during retraction of the cord into the housing, and for unwinding of the cord during extension of the cord from the housing; a spring biased lever arm that is rotatable about a pivot axis; a pulley located proximate one end of the spring biased lever arm, around which the cord is guided in traveling from the spool assembly to the opening in the housing; and a tensioning line attached proximate an end of the lever arm opposite to the pulley, the tensioning line being wrapped at least once around the spool assembly in engagement with a surface of the spool assembly, and attached to a portion of the leash that does not rotate with the spool assembly, such that the surface of the spool assembly slidingly slips in frictional engagement with the tensioning line wrapped at least once around the spool assembly; wherein pulling the cord from the housing causes pivoting movement of the spring biased lever arm about the pivot axis, which causes pulling of the tensioning line resulting in a tightening of the tensioning line about the wrapped surface of the spool assembly, and thereby creating greater frictional engagement with the rotating spool assembly.

7. The retractable leash of claim 6, wherein the tensioning line is attached at a fixed location to the leash housing.

8. The retractable leash of claim 6, wherein the tensioning line is attached at a fixed location on a mounting of the spool assembly on which the spool assembly rotates.

9. The retractable leash of claim 6, wherein the tensioning line is wrapped about a surface of the spool assembly that is axially offset from area about which the cord is wound.

10. The retractable leash of claim 6, wherein the tensioning line is wrapped about a surface of the spool assembly that is a radial distance greater than the radial distance of the area about which the cord is wound.

11. The retractable leash of claim 10, wherein the first tensioning line is wrapped about a surface of the spool assembly that is axially offset from area about which the second tensioning line is wound.

12. The retractable leash of claim 6, wherein the surface of the spool assembly about which the tensioning line is wrapped comprises a stainless wrapped surface.

13. The retractable leash of claim 6, wherein the housing defines a handle grip.

14. The retractable leash of claim 6, wherein the cord is retracted into the housing and wound onto the spool assembly by a spring biased mechanism.

15. The retractable leash of claim 6, further comprising a slide lock which can be manually actuated to engage the spool assembly and lock the spool assembly against unwinding of the cord relative to the housing, wherein when the slide lock is engaged and the cord is pulled, the lever arm is subject to further movement about pivot axis further resulting the tightening of the tensioning line about the spool assembly and thereby supplementing slide lock in restricting further unwinding of the spool assembly.

16. The retractable leash of claim 6, further comprising a resistance adjustment wheel configured to alter the extent to which the lever arm moves about pivot axis when pulled by the cord during extension of the cord from the housing by acting as a backstop to the range of movement of the lever arm and, thus, limiting the degree of tightening of the tensioning line the spool assembly and resulting friction created therebetween.

17. The retractable leash of claim 16, wherein the resistance adjustment wheel includes multiple settings, including a setting at which the range of motion of the lever arm is not limited by the adjustment wheel.

18. The retractable leash of claim 6, wherein the housing is formed from a molding process and further comprises sections of a co-molded elastomer.

19. A method of restraining a pet from extending a cord of a retractable leash too quickly while walking the pet, comprising the steps of:
(a) providing a leash comprising a housing including an opening in the housing from which a cord is extendable and into which the cord is retractable, the housing containing,
(i) a spool assembly onto which the cord is wound for winding of the cord during retraction of the cord into the housing, and for unwinding of the cord during extension of the cord from the housing,
(ii) a manually actuated slide lock for blocking the spool assembly from unwinding of the cord,
(iii) a spring biased lever arm that is rotatable about a pivot axis,
(iv) a pulley located proximate one end of the spring biased lever arm, around which the cord is guided in traveling from the spool assembly to the opening in the housing, and
(v) a tensioning line attached proximate an end of the lever arm opposite to the pulley, the tensioning line being wrapped at least once around the spool assembly in engagement with a surface of the spool assembly, and attached to a portion of the leash that does not rotate with the spool assembly, such that the surface of the spool assembly slidingly slips in frictional engagement with the tensioning line wrapped at least once around the spool assembly,
(vi) wherein pulling the cord from the housing causes pivoting movement of the spring biased lever arm about the pivot axis, which causes pulling of the tensioning line resulting in a tightening of the tensioning line about the wrapped surface of the spool assembly, and thereby creating greater frictional engagement with the rotating spool assembly;
(b) attaching an end of the cord extending from the housing to a collar or harness of the pet; and
(c) walking with the pet while holding a handle of the leash, wherein the method of restraining the pet does not require manual actuation of the slide lock of the leash.

20. A leash for restraining a pet from extending a cord of the leach too quickly while walking the pet, comprising: a housing including an opening in the housing from which a cord is extendable and into which the cord is retractable, the housing containing a spool assembly onto which the cord is wound for winding of the cord during retraction of the cord into the housing, and for unwinding of the cord during extension of the cord from the housing; a spring biased lever arm that is rotatable about a pivot axis; a pulley located proximate one end of the spring biased lever arm, around which the cord is guided in traveling from the spool assembly to the opening in the housing; and a tensioning line attached proximate an end of the lever arm opposite to the pulley, the tensioning line being wrapped at least once around the spool assembly in engagement with a surface of the spool assembly, and attached to a portion of the leash that does not rotate with the spool assembly, such that the surface of the spool assembly slidingly slips in frictional engagement with the tensioning line wrapped at least once around the spool assembly; wherein pulling the cord from the housing causes pivoting movement of the spring biased lever arm about the pivot axis, which causes pulling of the tensioning line resulting in a tightening of the tensioning line about the wrapped surface of the spool assembly, and thereby creating greater frictional engagement with the rotating spool assembly; wherein the tensioning line is attached at a fixed location to the leash housing; wherein the tensioning line is wrapped about a surface of the spool assembly that is axially offset from area about which the cord is wound; and wherein the leash further comprises a slide lock which can be manually actuated to engage the spool assembly and lock the spool assembly against unwinding of the cord relative to the housing, wherein when the slide lock is engaged and the cord is pulled, the lever arm is subject to further movement about pivot axis further resulting the tightening of the tensioning line about the spool assembly and thereby supplementing slide lock in restricting further unwinding of the spool assembly.

* * * * *